No. 746,735. PATENTED DEC. 15, 1903.
L. NAUDET.
METHOD OF CONTINUOUS CARBONATION OF SUGAR JUICE.
APPLICATION FILED MAY 7, 1903.
NO MODEL.
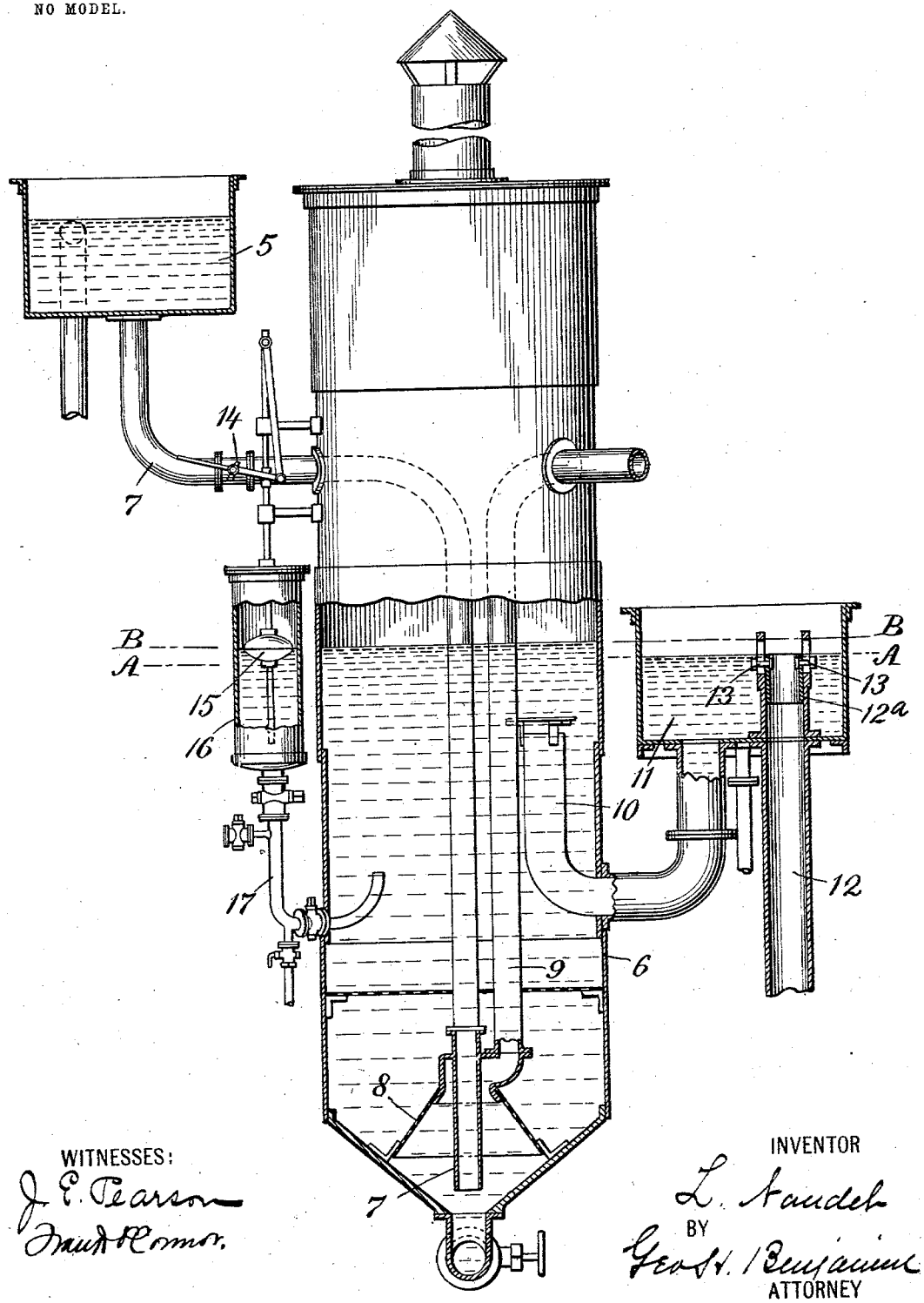
WITNESSES:
J. E. Pearson
Maud O'Connor
INVENTOR
L. Naudet
BY
Geo. H. Benjamin
ATTORNEY No. 746,735. Patented December 15, 1903.

UNITED STATES PATENT OFFICE.

LEON NAUDET, OF PARIS, FRANCE.

METHOD OF CONTINUOUS CARBONATION OF SUGAR-JUICE.

SPECIFICATION forming part of Letters Patent No. 746,735, dated December 15, 1903.

Application filed May 7, 1903. Serial No. 156,038. (No specimens.)

*To all whom it may concern:*

Be it known that I, LEON NAUDET, a citizen of the Republic of France, residing at Paris, France, have invented a Method of Continuous Carbonation of Sugar-Juice, of which the following is a specification.

My invention is based upon the following observed facts, first, that the viscosity of an alkaline sugar solution is inversely as its carbonation; second, that the rate of flow of alkaline sugar-juice through a pipe of definite section is inversely as its viscosity. Stating these facts in other words, if a definite amount of carbonic-acid gas is introduced into a definite quantity of sugar-juice of definite alkalinity a definite viscosity of the resulting liquid will be obtained, and such liquid will move through a pipe of definite diameter at a definite rate of speed. If now the quantity of carbonic-acid gas introduced is reduced, the viscosity of the liquid will be increased, and such increase will decrease the rate of flow of the liquid through the pipe. *Per contra*, if the amount of carbonic-acid gas introduced is increased the viscosity of the liquid will be decreased and the rate of flow of the liquid through the pipe will be increased.

From the above considerations it will be seen that if an apparatus can be designed which will automatically control the admission of the alkaline sugar-juice and the level of discharge of the carbonated sugar-juice uniform carbonation may be obtained and the degree of carbonation of the juice initially determined.

To carry my invention into effect, I may make use of the apparatus which I will now describe. I wish it understood, however, that I may use any other apparatus which will in its method of operation carry into effect the above-mentioned facts.

In the drawing, Figure 1 is a vertical section showing a tank which forms a source of supply for the alkaline sugar-juice, a treating vessel, and a second tank provided with means for initially determining the degree of carbonation or alkalinity of the sugar-juice.

In the drawing, 5 indicates a tank from which the alkaline sugar-juice is drawn. It will be assumed for the purposes of this description that the juice has a fixed alkalinity. The tank 5 is shown as situated above the treating vessel 6 and is connected to the bottom of the treating vessel through a pipe 7 of determined diameter. Surrounding the pipe 7 at the bottom of the treating vessel is a screen 8 and to the upper part of which is connected a pipe 9, leading out of the treating vessel and to a source of carbonic-acid gas, which gas is assumed to be under constant pressure, so that a definite amount of gas will be delivered per unit of time. It will be observed that the incoming alkaline sugar-juice and the gas are brought together under the screen 8, the object of which is to thoroughly intermingle these bodies and to prevent any coagulated masses passing upward in the treating vessel.

Leading from the interior of the treating vessel 6 is a pipe 10, which is carried to and discharges into a receiving-tank 11, situated at a level located at about the center of the treating vessel. The pipe 10 in diameter bears a definite relation to the pipe 7, and the outlet of the pipe 10 in the tank 11 is situated below its inlet in the treating vessel 6. Situated in the tank 11 is a pipe 12, in the upper end of which is a short section of pipe $12^a$, which may be raised or lowered by means of the adjusting-screw 13 to vary the distance of the outlet of the pipe 12 above the inlet of the pipe 10.

Situated in the pipe 7 is a butterfly-valve 14 under the control of a float 15, situated in casing 16, located at about the center of the treating vessel and connected to the interior of the treating vessel at its bottom through a pipe 17. The purpose of the float 15 is to control the movement of the butterfly-valve 14, and consequently the area of the opening of the pipe 7 to the treating vessel in accordance with the level of the liquid in the treating vessel.

The method of operation of the device is as follows: It is evident from the above statement that with any fluid a normal liquid-level will be found in the treating vessel. This is due to the fact that the tank 5 is located a definite distance above the tank 11 and that the diameters of the pipes 7, 10, and and 12 have a definite relation. This may be indicated by the following equation: Where W indicates the section of the pipe 7, W' the section of the pipe 10, and H the height between the tank 5 and the tank 11, and as H is divisible into two heights $h$ $h'$, where $h$ represents the height between the top of the fluid in the tank 11 and the normal level of the fluid in the treating vessel 6 and $h'$ the height between the top of the fluid in the tank 11 and the maximum level reached by the fluid in the treating vessel 6, we have $\frac{h}{h'} = \frac{w'}{w}$.

The above principle only applies to a liquid whose density or viscosity is maintained constant. As applied to a vessel in which the carbonation of sugar-juice is effected conditions prevail which modify the principle. For instance, if we take a juice containing sugar intimately mixed with a determined amount of lime and cause it to run from the tank 5 into the vessel 6 and be discharged into the tank 11 there will be obtained a definite level in the vessel 6, as will be the case with any liquid. If now, however, there is introduced into the vessel 6 carbonic-acid gas, the lime present in the juice will be carbonated by the gas. If not enough gas is introduced to carbonate all the lime in suspension, froth will be formed and, further, the viscosity of the liquid will be increased, which will decrease the velocity of flow of the liquid from the vessel, and as the liquid in such case will enter more rapidly than it leaves the vessel 6 the level of the liquid in the vessel 6 will rise. On the contrary, if there is introduced a greater amount of carbonic-acid gas than is necessary to saturate the lime contained in the liquid the liquid will then be too much carbonated and will run out of the vessel 6 faster than it is fed into it, and hence the level of the liquid fall in the vessel 6. Experience therefore demonstrates that when a juice is slightly carbonated it will run less quickly than when it is very much carbonated, or, in other words, as originally stated, that the viscosity of a sugar solution is inversely as its carbonation.

It will be understood from the description as given that a determined level in the treating vessel corresponds to a determined point of carbonation. If we assume this level to be A A—i. e., the level of the top of the discharge-pipe 12ª—and maintain the alkalinity of the sugar-juice and the rate of ingress of carbonic-acid gas, it is evident that if the level of the discharge from pipe 12ª is raised above A A the liquid discharged at this new level—i. e., B B—will be of greater viscosity than that discharged from the level A A, and consequently subjected to a less degree of carbonation, or, in other words, a greater degree of alkalinity. As it is possible that the amount of carbonic-acid gas introduced per unit of time may be altered, it is necessary to provide means for regulating the amount of introduced alkaline sugar-juice in order to obtain a uniform product, and this is obtained as follows: Assuming the introduced juice, carbonated to a definite degree, to occupy a definite level in the treating vessel, if now the amount of gas introduced, as before stated, should decrease the viscosity of the sugar solution will increase, the outflow from the treating vessel decrease, and the level within the treating vessel increase. This increase of level acts to move the float 15 upward, which acts upon the butterfly-valve 14 to partially close this valve, or, in other words, move this valve to a position where the inflow of alkaline juice corresponds to the inflow of gas to produce a definite degree of carbonation. In some cases the valve may rise to a point to wholly shut off the introduction of alkaline juice, which valve will be again opened when the introduced gas has reduced the viscosity of the solution to the required degree and reëstablished the normal carbonation level in the vessel.

In considering the method involved in this application it is important to differentiate density from viscosity. Addition of the carbonic-acid gas to the lime solution, the carbonic-acid gas having ponderable weight, increases the weight of the solution and its density, density and viscosity going hand in hand up to a certain point, when the density continues to increase; but the viscosity decreases. Hence it will be seen that it is not the density of the solution which acts to determine the level, but the rate of flow of the carbonated sugar-juice as effected by its viscosity.

In French Patent No. 295,906, dated January 5, 1900, and granted to Emile Duplos and Edmund Duplos and Leon Naudet, of Paris, France, there is described a process of and apparatus for the continuous carbonation of alkaline sugar-juice, which process involves varying the amount of introduced sugar-juice in accordance with the height of the carbonated sugar-juice in the treating vessel. This process does not contemplate the initial determination of the carbonation level in the treating vessel, or, in other words, the initial carbonation which should be given to the alkaline liquid, and therein differs from the process herein described.

Having thus described my invention, I claim—

1. The herein-described method of obtaining a carbonated sugar-juice of definite alkalinity, which consists first in introducing into a treating vessel a certain amount of sugar-juice of definite alkalinity, and a certain amount of carbonic-acid gas, and subsequently varying the relative proportions of such introduced bodies, in accordance with the variations in the alkalinity of the carbonated sugar-juice flowing from the vessel, from the initially-determined alkalinity for such juice.

2. The herein-described method of carbonating sugar-juice, which consists in introducing in a treating vessel an alkaline juice and carbonic-acid gas, initially determining a carbonation-level, and in altering the amount of one or the other of the introduced bodies in accordance with the changes in such level.

3. The herein-described method of carbonating sugar-juice, which consists in introducing into a treating vessel an alkaline juice and carbonic-acid gas, initially determining a carbonation-level, and in altering the amount of introduced juice in accordance with the changes in such level.

In testimony whereof I affix my signature in the presence of two witnesses.

LEON NAUDET.

Witnesses:
J. E. PEARSON,
FRANK O'CONNOR.